United States Patent [19]

Weller et al.

[11] 4,328,986
[45] May 11, 1982

[54] MULTI-MEDIA ENERGY ABSORBERS (FLEX STRADDLE)

[75] Inventors: Peter A. Weller; Jerry V. Scrivo, both of Durham, N.H.

[73] Assignee: Ex-Cell-O Corporation, Troy, Mich.

[21] Appl. No.: 89,593

[22] Filed: Oct. 29, 1979

Related U.S. Application Data

[63] Continuation-in-part of Ser. No. 894,593, Apr. 7, 1978, abandoned.

[51] Int. Cl.³ .............................................. B60R 19/06
[52] U.S. Cl. .................................. 293/120; 293/122; 293/136
[58] Field of Search ........................ 293/120, 122, 136

[56] References Cited

U.S. PATENT DOCUMENTS

| 3,514,144 | 5/1970 | Alderfer | 293/120 |
| 3,574,379 | 4/1971 | Jordan | 293/120 |
| 3,690,710 | 9/1972 | Curran | 293/120 |
| 3,739,882 | 6/1973 | Schwenk | 293/120 |
| 3,888,531 | 6/1975 | Straza | 293/120 |
| 3,894,763 | 7/1975 | Barényi | 293/120 |
| 3,938,841 | 2/1976 | Glance | 293/120 |
| 3,999,793 | 12/1976 | Roubinet | 293/120 |
| 4,022,505 | 5/1977 | Saczawa | 293/120 |
| 4,061,385 | 12/1977 | Schwartzberg | 293/120 |
| 4,070,052 | 1/1978 | Na | 293/120 |
| 4,076,296 | 2/1978 | Ditto | 293/122 |
| 4,221,413 | 9/1980 | Bonnetain | 293/122 |

Primary Examiner—Joseph F. Peters, Jr.
Assistant Examiner—John A. Carroll
Attorney, Agent, or Firm—McGlynn and Milton

[57] ABSTRACT

An elongated energy-absorbing bumper assembly including energy-absorbing elastomeric or foam material extending between a rear mounting surface and a front impact surface with the material defining a hollow recess extending thereinto from the rear mounting surface and positioned between the ends of the assembly. The elastomeric foam material extends to the rear mounting surface at both ends of the hollow recess to define block-like end portions of the elastomeric material. A structural member extends between the block-like end portions of elastomeric material with the ends of the member embedded in the elastomeric foam material. The elastomeric material is the sole support and means of positioning the member so that the member is allowed unguided movement with the elastomeric material in multiple directions upon impact.

6 Claims, 13 Drawing Figures

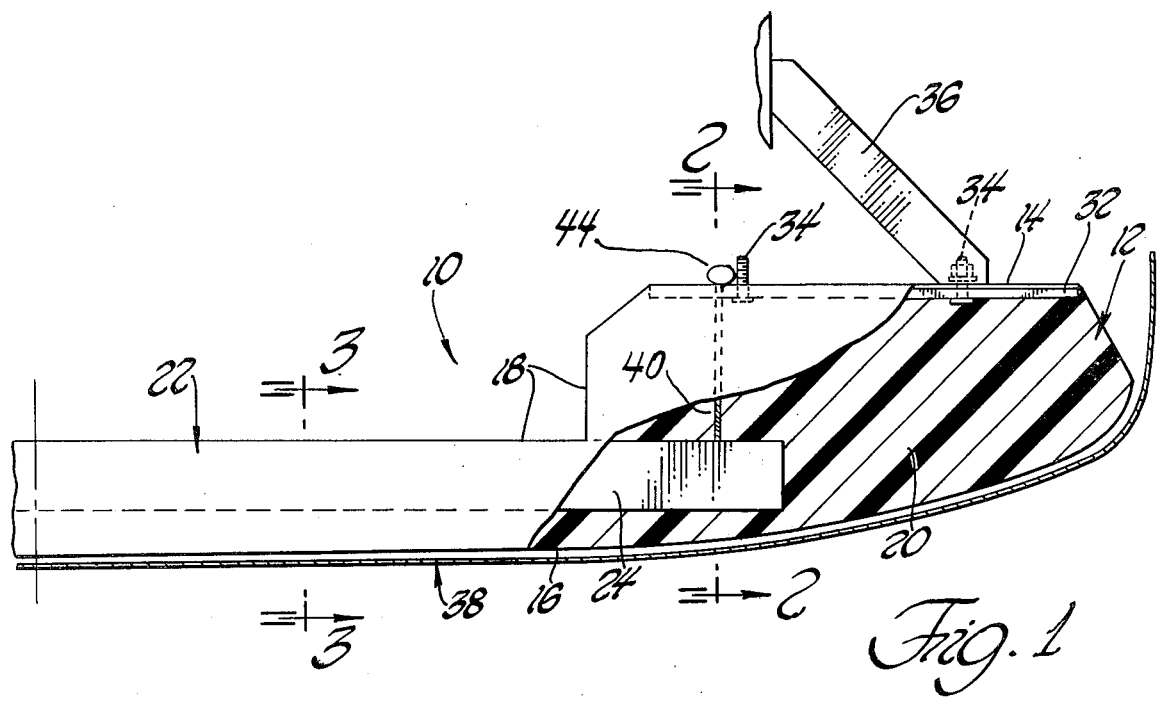
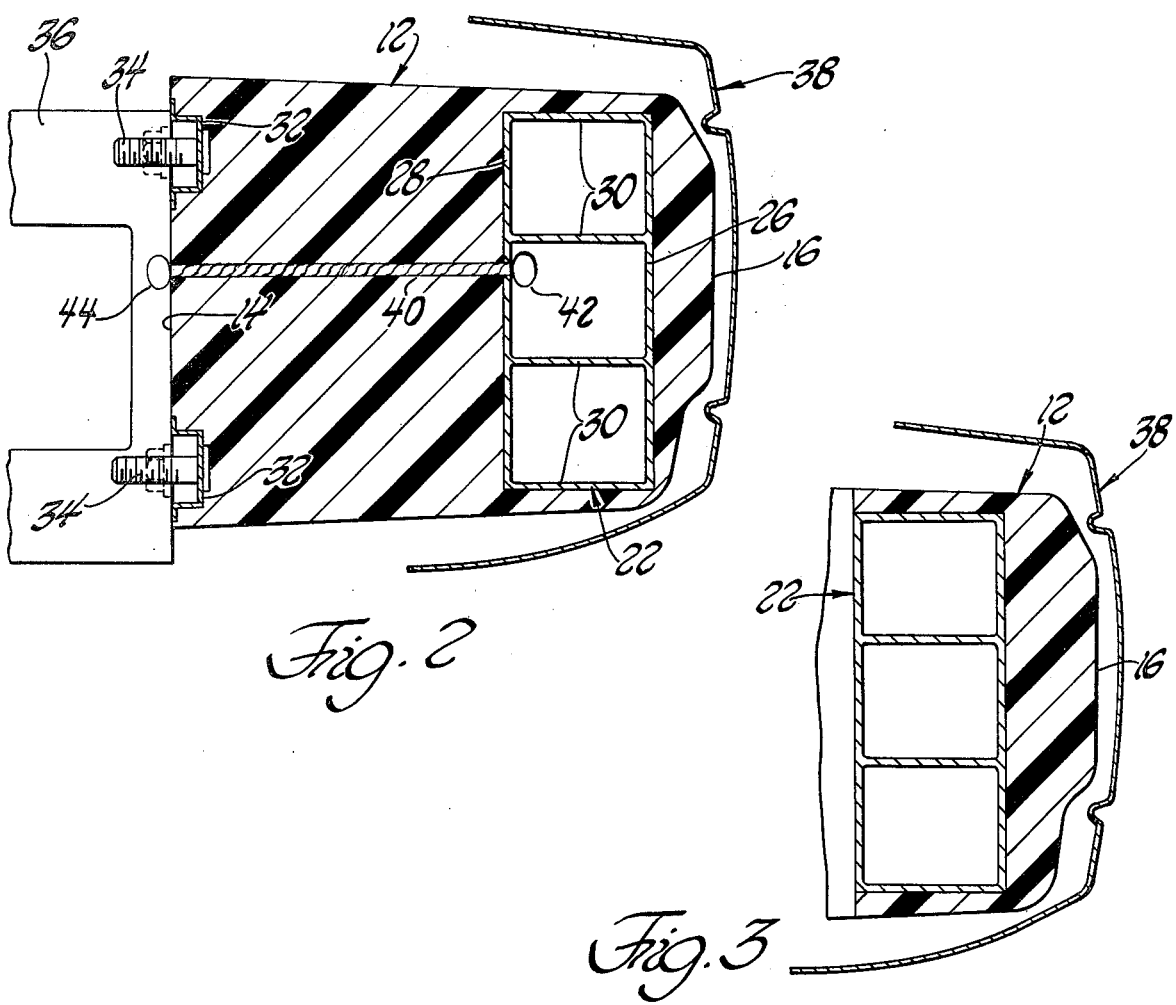

4,328,986

MULTI-MEDIA ENERGY ABSORBERS (FLEX STRADDLE)

The subject application is a continuation-in-part of application Ser. No. 894,593 filed Apr. 7, 1978 and now abandoned.

BACKGROUND OF THE INVENTION (1) Field of the Invention

This invention relates to an energy absorber bumper assembly of the type utilized on vehicles such as automobiles for absorbing energy in the event the automobile experiences an impact such as in a collision. Various configurations of energy-absorbing bumper assemblies have been investigated and utilized. The subject invention is particularly related to the use of an energy-absorbing elastomeric foam, such as a urethane or the like, for absorbing energy.

(2) Description of the Prior Art

Various configurations of energy-absorbing bumper assemblies are known to the prior art in which an elastomeric foam is utilized as an energy absorber. Normally, the bumper assembly includes a longitudinally-extending structural mounting member which in turn supports the elastomeric material with the mounting member being adapted for attachment to the structure of the vehicle. Frequently, the structure of the vehilce, to which the forces may be transmitted from the energy-absorbing bumper assembly, are spaced from one another whereby there are voids across the vehicle of structure which could withstand forces transmitted from the energy-absorbing bumper assembly. Accordingly, the structural mounting members are included in the bumper assembly for transmitting such forces to the appropriate structural members of the vehicle. As an example, in the front of most vehicles the radiator is placed centrally of the vehicle and there is no vehicle structure in the radiator area to which the forces may be transmitted. On the other hand, the structural mounting member included in bumper assemblies adds significant weight to the vehicle yet is included to account for impacts at either end of the bumper assembly and particularly those impacts in the middle of the bumper assembly whereby forces may be transmitted to the laterally spaced structural members of the vehicle. Further, bumper assemblies must allow for the passage of air to the radiator to maintain the cooling of the vehicle engine. In accordance with the subject invention a bumper assembly is provided whereby the mounting structural member is eliminated to reduce the weight of the bumper assembly and which bumper assembly also allows for voids in structural integrity of the vehicle such as the area of the radiator and to allow the passage of cooling air to the radiator.

SUMMARY OF THE INVENTION

The subject invention relates to an elongated energy-absorbing bumper assembly including energy-absorbing elastomeric material extending between a rear mounting surface and a front impact surface. The elastomeric material defines a hollow recess extending thereinto from the rear mounting surface with the hollow recess being positioned between the ends of the assembly whereby the elastomeric material extends to the rear mounting surface at both ends of the hollow recess to define block-like end portions of the elastomeric material. A structural member extends between the block-like end portions with the ends thereof embedded in the block-like end portions. The elastomeric material is the sole support and means of positioning the member so that the member is allowed unguided movement with the elastomeric material in multiple directions in response to impact.

PRIOR ART STATEMENT

A novel feature of the subject invention is that the ends of the structural member are embedded within the elastomeric material with the elastomeric material being the sole support of the member. It has been known in the prior art to utilize a plate which, upon impact, compreses foam material to absorb energy. Such an assembly is illustrated in U.S. Pat. No. 3,666,310 granted to Burgess et al on May 30, 1972. This patent discloses a plate which may be totally encapsulated in the foam material; however, the plate has its movement guided or restricted by sliding pins connected to the plate. Further, there is no suggestion in this patent of providing a hollow recess in the elastomeric material and embedding the ends of a structural member in the elastomeric material. The prior art also teaches the use of longitudinally extending bar in a bumper assembly supported by spaced blocks of elastomeric or resilient material. This bar acts as a bumper and extends completely across the vehicle. Such is illustrated in U.S. Pat. No. 3,361,467 to Ludwikowski granted Jan. 2, 1968. Again, however, this patent does not suggest the subject invention wherein the elastomeric material has a hollow recess and a structural member is supported by the elastomeric material with the ends of the member embedded within the elastomeric material.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a plan view partially broken away and in cross section of a bumper assembly constructed in accordance with the subject invention;

FIG. 2 is a cross-sectional view taken substantially along line 2—2 of FIG. 1;

FIG. 3 is a cross-sectional view taken substantially along line 3—3 of FIG. 1;

DESCRIPTION OF PREFERRED EMBODIMENTS

Figure 4:
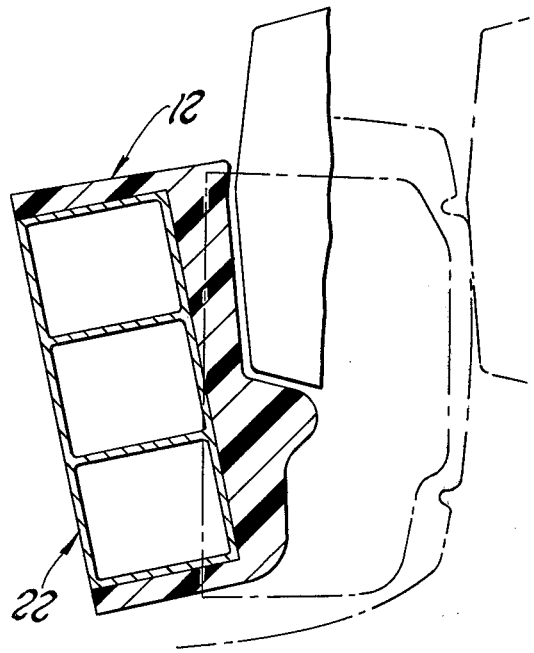
FIG. 4 is a cross-sectional view at the center line of the bumper assembly showing the assembly before impact in phantom and showing the result of the impact at a high position only at a position centrally of the bumper in full lines.

An elongated energy-absorbing bumper assembly is generally shown at 10 in FIG. 1.

The assembly includes energy-absorbing elastomeric material generally indicated at 12. The elastomeric material 12 extends between a rear mounting surface 14 and a front impact surface 16. The elastomeric material 12 defines a hollow recess 18 extending thereinto from the rear mounting surface 14 toward the front surface 16. The recess 18 is positioned between the ends of the assembly. Only one-half of the assembly is shown in FIG. 1 and it will be appreciated that the opposite end of the assembly is a mirror image of that shown in FIG. 1. The recess 18 is therefore positioned centrally between the ends of the assembly so that the elastomeric material 12 extends to the rear mounting surface 14 at both ends of the hollow recess 18 to define block-like end portions 20 of the elastomeric material. Preferably the elastomeric material is a foam plastic material such as microcellular polyurethane foam. One formulation which may be used for the elastomeric material is disclosed in U.S. Pat. No. 3,575,896 granted Apr. 20, 1971 in the name of O. R. Khan and assigned to the assignee of the subject invention.

The assembly also includes a structural member generally indicated at 22 and extending between the block-like end portions 20. The ends 24 of the member 22 are embedded in the elastomeric material 12 so that the elastomeric material is the sole support and means of positioning the member so that the member is allowed unguided movement with the elastomeric material in multiple directions upon impact as is illustrated in FIGS. 4 through 10. It is important to note that as viewed in FIG. 1 the ends 24 of the member are completely embedded within the elastomeric material, i.e., front-to-back of the member. In other words, the elastomeric material extends from the rear of the member around the end of the member to the front of the member. The elastomeric material is disposed outboard of the ends of the member, i.e., the elastomeric material abuts the ends of the member. To describe the combination another way, the structural member 22 extends between the block-like end portions 20 with the member 22 being free of other support and/or positioning means so that upon impact of the member only the elastomeric material reacts to the movement of the structural member 22. This allows the member to "float" in or with the elastomeric material. Such has been found to provide unexpected results in that the member does not cock sufficiently about its longitudinal axis to allow the impact member to ride over the member. In other words, there is continuous engagement with the impact member by the member because the ends of the member are embedded within the elastomeric foam material.

As illustrated, the ends 24 of the member 22 overlap the block-like end portions 20 of the elastomeric material. Additionally, the member has a cross section which is elongated vertically in a direction generally parallel to the front and rear surfaces of the elastomeric material so that the member includes front and rear faces 26 and 28 as illustrated in FIG. 2. The member 22 includes a front plate defining the front face 26 with at least one, but as illustrated, four horizontally extending flanges 30. The flanges 30 extend rearwardly from the front plate 26 and are integrally connected to a rear plate 28. The member may be fabricated with merely a front plate and one or more rearwardly extending flanges to provide the member with the proper structural integrity. However, the member 22 includes a front plate 26 and structure integral with the front plate to define longitudinally extending enclosed cells as viewed in cross section. The member may be made of reinforced plastic, steel, aluminum, or the like. In some instances it would be desirable for the member to be substantially rigid longitudinally of its length but in other circumstances the member is preferably flexible so as to be able to bend between the ends in response to an impact. In such bending a portion of the energy absorption of the impact will be taken up by the flexing or bending of the member between its ends. Of course, upon a center impact, i.e., the bumper assembly having an impact between the block-like portions 20, the member, if flexible, would bend to absorb some energy but would also compress the block-like portions 20 whereby the block-like portions 20 would absorb the remaining energy of the impact. The elastomeric material 12 extends over or along the front face of the member 22 between the ends thereof. There is some energy absorption by the elastomeric material disposed longitudinally on the front face of the member 22 in the event of an impact substantially at the longitudinal center line of the assembly.

The assembly also includes mounting means comprising the channels 32 disposed on the rear mounting surfaces 14 of the block-like end portions 20 for attaching the assembly 10 to the support structure 36 of a vehicle. The channel members 32 support the studs 34 which may be inserted through appropriate apertures in the support structure of a vehicle.

In the preferred embodiment illustrated the hollow recess 18 extends from the rear mounting surface 14 to the member 22 whereby the member 22 defines the bottom of the hollow recess 18.

Typically, the bumper assembly would be covered by a fascia 38 attached to the vehicle body. Alternatively, the elastomeric material 12 may have a decorative skin thereon.

FIG. 4 is a view showing the bumper assembly experiencing an impact by a member only along the longitudinal central portion of the assembly with the impact member hitting the bumper assembly above the longitudinal center line. FIG. 4 illustrates that the member 22 cocks but that the impact member does not ride over the member and the member transmits energy to the block-like end portions 20 which are in turn supported by structural members of the vehicle.

Figure 5:
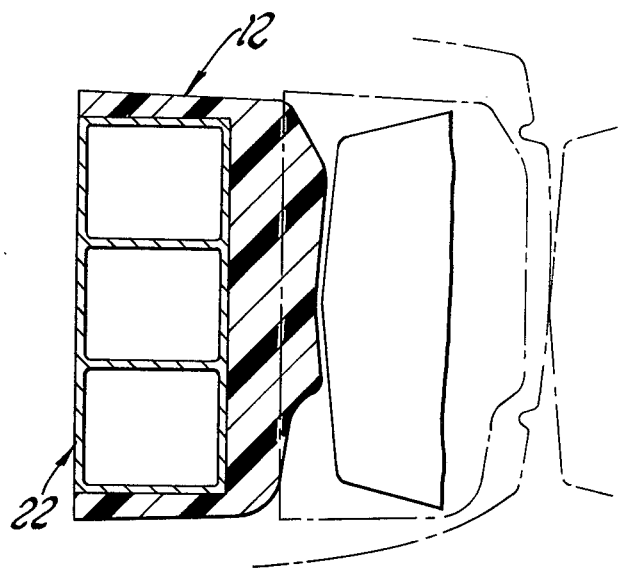
FIG. 5 is a view similar to FIG. 4 but showing an impact only along the central portion of the bumper at the vertical midsection.

FIG. 5 is a view showing the same impact member hitting the bumper assembly at the longitudinal center line whereby the member 22 remains vertical and moves straight rearwardly to transmit impact forces to the block-like end portions 20.

Figure 6:
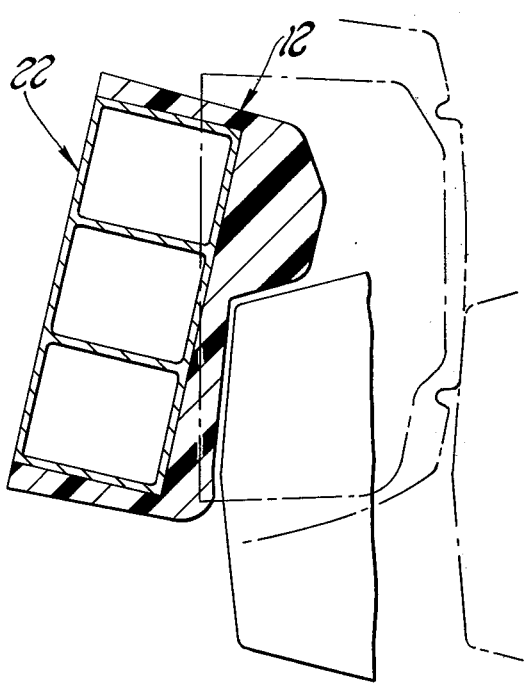
FIG. 6 is also a view similar to FIG. 4 but showing an impact only along the central portion of the bumper and at a vertically low position.

FIG. 6 shows the impact member hitting the center of the assembly but below the longitudinal center line. As illustrated in FIG. 6 the member 22 is cocked or rotates in the opposite direction in response to the impact but again is able to transmit the energy of the impact to the elastomeric block-like portions 20.

Figure 7:
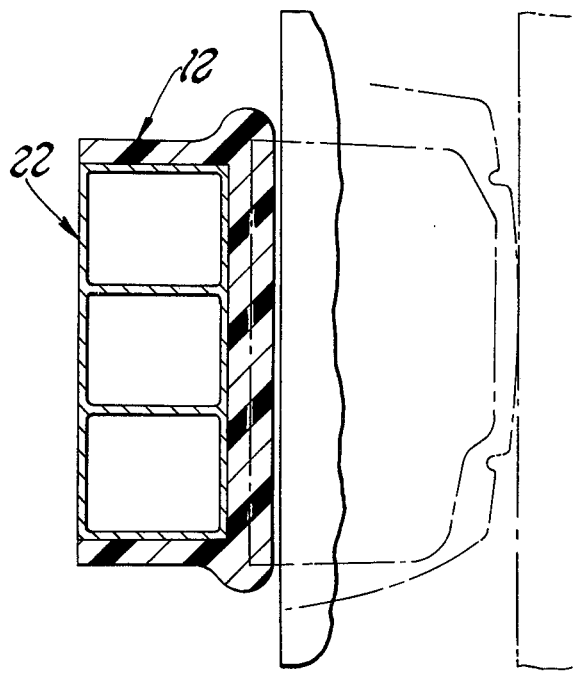
FIG. 7 is a cross-sectional view at the center line of the bumper assembly but showing the results of a full barrier impact which extends the full length of the bumper assembly.

FIG. 7 illustrates a full barrier impact where the bumper is impacted all along the bumper between its ends thereof and illustrates that the member 22 moves straight rearwardly to transmit energy to the block-like end portions 20. Preferably, approximately ten to twenty percent of the total elastomeric material 12 is disposed in front of the member 22. This foam in front of the member 22 absorbs a portion of the energy of the impact.

Figure 8:
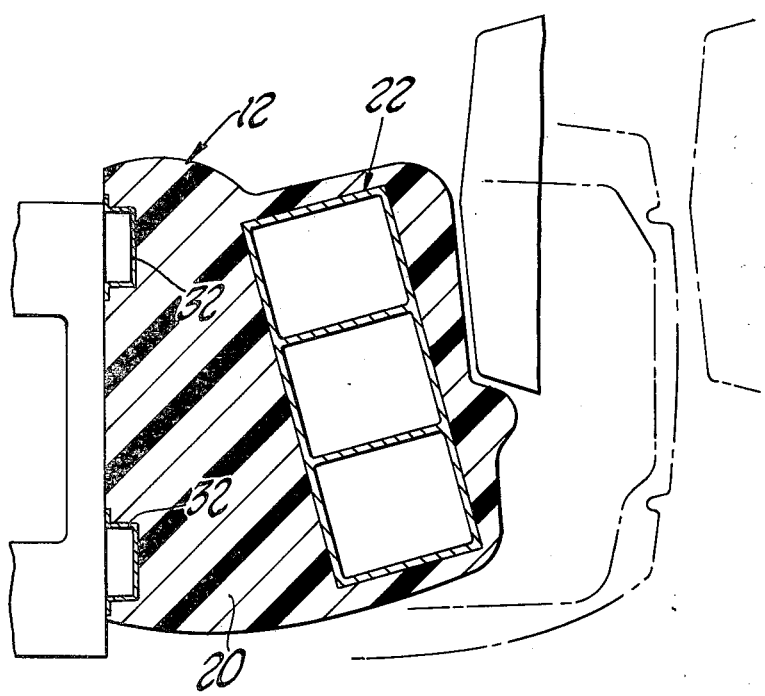
FIG. 8 is a cross-sectional view at approximately line 2—2 of FIG. 1 but showing the end of the bumper assembly being impacted at a high position or above the center line.
Figure 9:
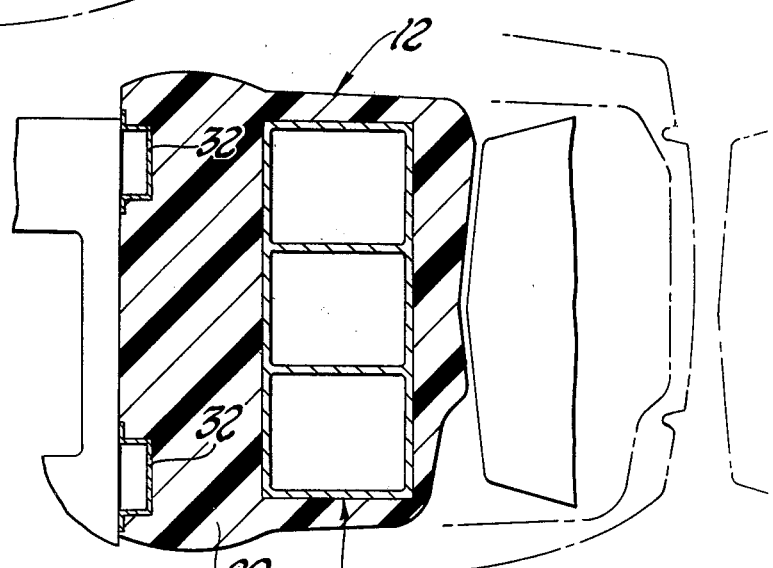
FIG. 9 is a view similar to FIG. 8 but showing the impact at the vertical center of the end of the bumper assembly.
Figure 10:
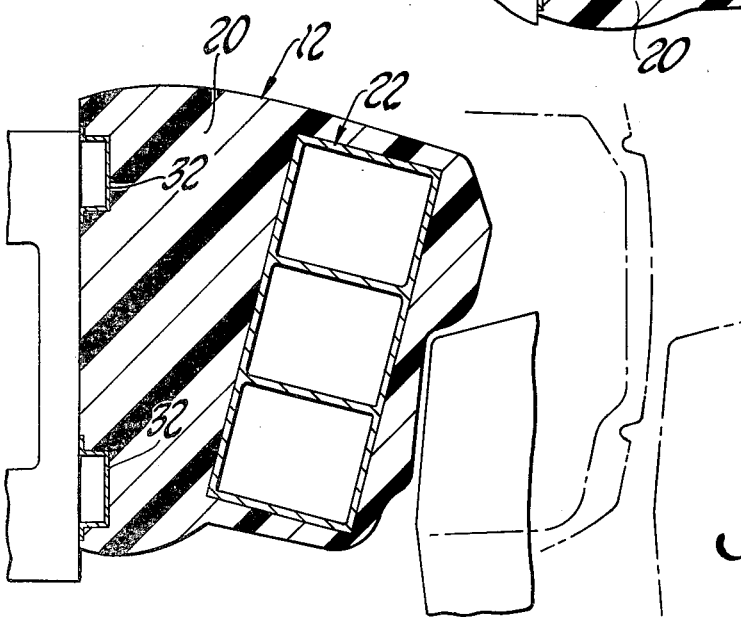
FIG. 10 is a view similar to FIG. 8 but showing the impact below the vertical center.

FIG. 8 is a cross section showing the block-like end portion 20 of the assembly with the impact being above the longitudinal center line or median. It has been found in this impact situation the member 22 has no effect upon energy absorption and, in effect, merely floats or moves with the elastomeric material 12. The same is true of FIG. 9 wherein the impact member is engaging the end of the bumper assembly at the longitudinal center line whereby all of the energy is absorbed by the block-like end portion 20. FIG. 10 is a view similar to FIG. 8 but showing the impact member hitting the end portion of the bumper assembly below the longitudinal center line where again the member 22 has no energy absorption effect.

Figure 11:
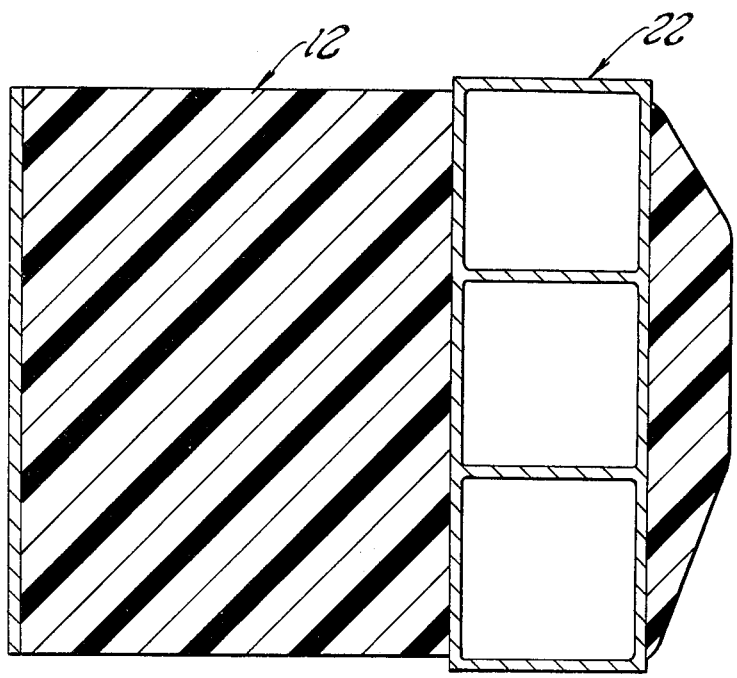
FIG. 11 is a view similar to FIG. 2 but showing a modification of the subject assembly.
Figure 12:
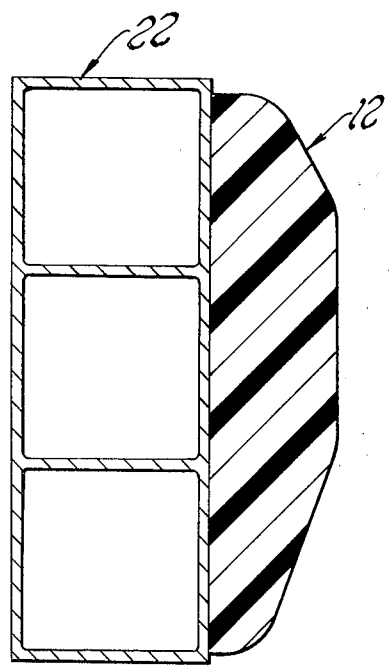
FIG. 12 is a cross-sectional view of the assembly shown in FIG. 11 but showing the longitudinal central portion of the bumper in the manner of FIG. 3.

In the embodiment illustrated in FIGS. 1 through 9 the elastomeric material completely embeds the ends 24 of the member 22. The embodiment of FIG. 11 is a modification wherein the ends of the member 22 are embedded within the elastomeric material but not completely surrounded as the top and bottom longitudinal surfaces of the member 22 are not covered by the elastomeric material. FIG. 11 shows a cross section through an end portion of such a bumper assembly whereas FIG. 12 shows a cross-sectional view through the longitudinal center of such a bumper assembly wherein the elastomeric material 12 is disposed only on the front face of the member and not over the tops and bottoms thereof.

Figure 13:
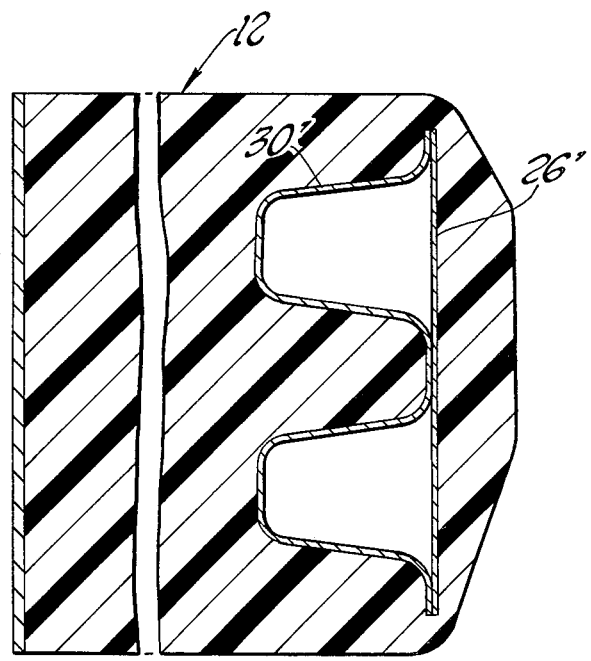
FIG. 13 is a cross-sectional view of the bumper assembly showing a modified structural member construction.

FIG. 13 shows a modification wherein the configuration of the member is different but where the member includes a front plate 26' with rearwardly extending horizontal flanges 30' which are interconnected to define longitudinally enclosed cells.

Instead of one structural member 23 there could be included two parallel members, i.e., an upper member and a lower member.

Because it is possible when the assembly 10 is placed upon an automobile to two the automobile by applying a force to the rear of the structural member 22 as by a chain, or the like, flexible cable means 40, as illustrated in FIGS. 1 and 2 may be included. The flexible cable means 40 may take many forms and be made of various different materials but preferably is made of a braided metal cable which would carry a load under tension but being completely flexible, will collapse when placed in compression or otherwise bent, i.e., it will only carry a load in compression. The flexible cable 40 is connected to the structural member 22 by a connector 42. The connector 42 may be a clamp, a welding, a pin through a loop in the cable, etc., which prevents the cable 40 from moving out through the hole in the rear wall or face 28 of the structural member 22. The cable 40 extends from the connector 42 to the rear mounting surface and a connector 44 which may take the same form as the connector 42 to attach the cable to the support structure or the vehicle. Thus, the cable 40 would be placed in tension in response to a force urging the structural member 22 forwardly while at the same time allowing the unguided and free movement of the structural member 22 in response to an impact. In other words, upon impact, as illustrated in FIGS. 4 through 10, the cable means 40 would merely collapse and would in no way interfere with the unsupported movement of the structural member 22.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An elongated energy-absorbing bumper assembly comprising; energy-absorbing elastomeric material extending between a rear mounting surface and a front impact surface, said material defining a hollow recess extending thereinto from said rear mounting surface and positioned between the ends of said assembly with said material extending to said rear mounting surface at both ends of said hollow recess to define block-like end portions of said elastomeric material, a structural member extending forwardly of said recess between said block-like end portions with the ends of said member being completely embedded in and completely encapsulated by said block-like end portions of said elastomeric material so that said block-like end portions of said elastomeric material are the sole support and means of positioning said member relative to said elastomeric material so that said member is allowed unguided movement with said elastomeric material in multiple directions upon impact.

2. An assembly as set forth in claim 1 wherein said elastomeric material extends over said front face of said member between the ends thereof.

3. An assembly as set forth in claim 1 wherein said hollow recess extends from said rear mounting surface to said member whereby said member defines the bottom of said hollow recess.

4. An assembly as set forth in claim 1 wherein said member is flexible so as to bend between the ends thereof in response to impact to thereby absorb a portion of the impact energy.

5. An assembly as set forth in claim 1 wherein said member includes a front plate with at least one horizontally extending flange extending rearwardly from said front plate.

6. An assembly as set forth in claim 5 wherein said member includes structure integral with said front plate and said flange to define at least one longitudinally extending enclosed cell as viewed in cross section.

* * * * *